(12) United States Patent
Hawkins

(10) Patent No.: US 7,979,497 B2
(45) Date of Patent: Jul. 12, 2011

(54) MESSAGE DELIVERY USING A PLURALITY OF QUEUE MANAGERS

(75) Inventor: John Christopher Hawkins, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 12/359,920

(22) Filed: Jan. 26, 2009

(65) Prior Publication Data

US 2009/0193091 A1    Jul. 30, 2009

(30) Foreign Application Priority Data

Jan. 25, 2008  (EP) .................................. 08150653

(51) Int. Cl.
*G06F 13/00* (2006.01)
(52) U.S. Cl. ........ 709/206; 709/234; 709/232; 709/245; 709/223; 718/105
(58) Field of Classification Search .................. 709/206, 709/230, 232, 234, 236, 245, 246, 223; 718/105, 718/104, 102
See application file for complete search history.

(56) References Cited

U.S. PATENT DOCUMENTS

| 6,789,143 | B2 * | 9/2004 | Craddock et al. ............... 710/54 |
| 7,194,516 | B2 * | 3/2007 | Giacobbe et al. ............. 709/206 |
| 7,567,965 | B2 * | 7/2009 | Giacobbe et al. ..................... 1/1 |
| 2003/0182464 | A1 | 9/2003 | Hamilton et al. |
| 2006/0089931 | A1 * | 4/2006 | Giacobbe et al. ................. 707/9 |
| 2009/0193090 | A1 * | 7/2009 | Banks et al. .................. 709/206 |

OTHER PUBLICATIONS

Ian Vanstone, et al., Method and System for Message Delivery in Messaging Networks, Filed Dec. 10, 2008, U.S. Appl. No. 12/331,528, International Business Machines Corporation.

* cited by examiner

*Primary Examiner* — Kenneth R Coulter
(74) *Attorney, Agent, or Firm* — Dillon & Yudell LLP

(57) ABSTRACT

A method and system for message delivery in a messaging network are provided for enabling scaling. A messaging network includes a group of a plurality of queue managers, each of which includes means for carrying out a method comprising: receiving a message at a queue manager, removing at least some of the original message data to form a link message, adding a reference to the link message referring to the queue manager, sending the link message to a link message queue, and putting the original message to a local queue on the first queue manager. A link message queue may provided on each of the queue managers in the group, or single link message queue may be provided on one queue manager and accessible by the other queue managers in the group.

21 Claims, 10 Drawing Sheets

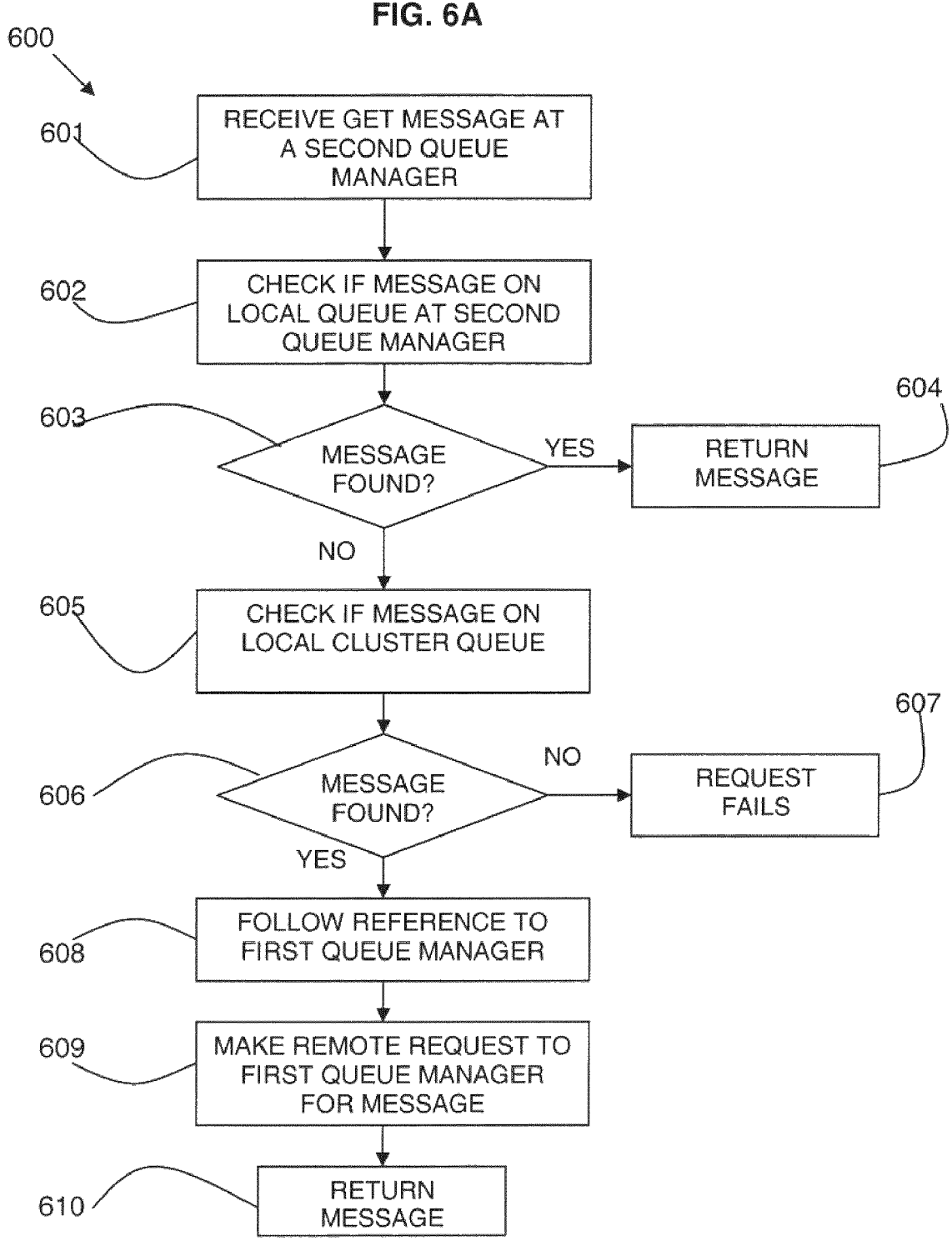

MESSAGE DELIVERY USING A PLURALITY OF QUEUE MANAGERS

FIELD OF INVENTION

This invention relates to the field of message delivery. In particular, the invention relates to scaling in messaging networks.

BACKGROUND

Message delivery in messaging networks, such as clusters of queue managers, have a problem in scaling as, when load-balancing is used, a client has no control over which one of multiple queue managers a message request is put. Load-balancing is used to send messages to any one of the queue managers in a messaging network. This has the problem that a request for a specific message by another client must be made to the same queue manager otherwise the client is left hanging.

This problem particularly manifests itself in the environment of HTTP (hypertext transfer protocol) in messaging. The HTTP environment traditionally relies on horizontal scaling. An HTTP client puts a message onto a queue manager on a first machine. The client had no say as to which machine their put request went to because the HTTP requests were load-balanced around the server by an edge server. A second HTTP client then does a request for the message; however, the edge server may send this request to a different queue manager and so the second HTTP client is left hanging.

SUMMARY

According to a first aspect of the present invention there is provided a method for message delivery in a messaging network having a group of a plurality of queue managers, the method comprising: receiving a message at a first queue manager; removing at least some of the original message data to form a link message; adding a reference to the link message referring to the first queue manager; sending the link message to a link message queue; and putting the original message to a local queue on the first queue manager.

The method may also include: receiving a request to retrieve a message at a second queue manager in the group; checking the local queue of the second queue manager for the message; checking the link message queue of the second queue manager and, if a link message is found: retrieving the message from the queue manager referenced in the link message.

According to a second aspect of the present invention there is provided a computer software product for message delivery, the product comprising a computer-readable storage medium, storing in a computer in which program comprising computer-executable instructions are stored, which instructions, when executed by a computer, perform the following steps: receiving a message at a first queue manager; removing at least some of the original message data to form a link message; adding a reference to the link message referring to the first queue manager; sending the link message to a link message queue; and putting the original message to a local queue on the first queue manager.

According to a third aspect of the present invention there is provided a computer software product for message delivery, the product comprising a computer-readable storage medium, storing in a computer in which program comprising computer-executable instructions are stored, which instructions, when executed by a computer, perform the following steps: receiving a request to retrieve a message at a queue manager in a group of queue managers; checking a local queue of the queue manager for the message; checking a link message queue of the queue manager and, if a link message is found retrieving the message from a queue manager referenced in the link message.

According to a fourth aspect of the present invention there is provided a system for message delivery, comprising: a messaging network including a group of a plurality of queue managers that execute on a plurality of processors, each queue manager including a local queue; each of the queue managers including: means for creating a link message by removing at least some of the original message data from a received message and adding a reference to the link message referring to the queue manager at which the message has been received; and means for sending the link message to a link message queue accessible by all the queue managers in the group.

The subject matter regarded as the invention is particularly pointed out and distinctly claimed in the concluding portion of the specification.

BRIEF DESCRIPTION OF THE DRAWINGS

The invention, both as to organization and method of operation, together with objects, features, and advantages thereof, may best be understood by reference to the following detailed description when read with the accompanying drawings in which:

FIGS. 6A to 6C are flow diagrams aspects of a message retrieval process in accordance with aspects of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1A:
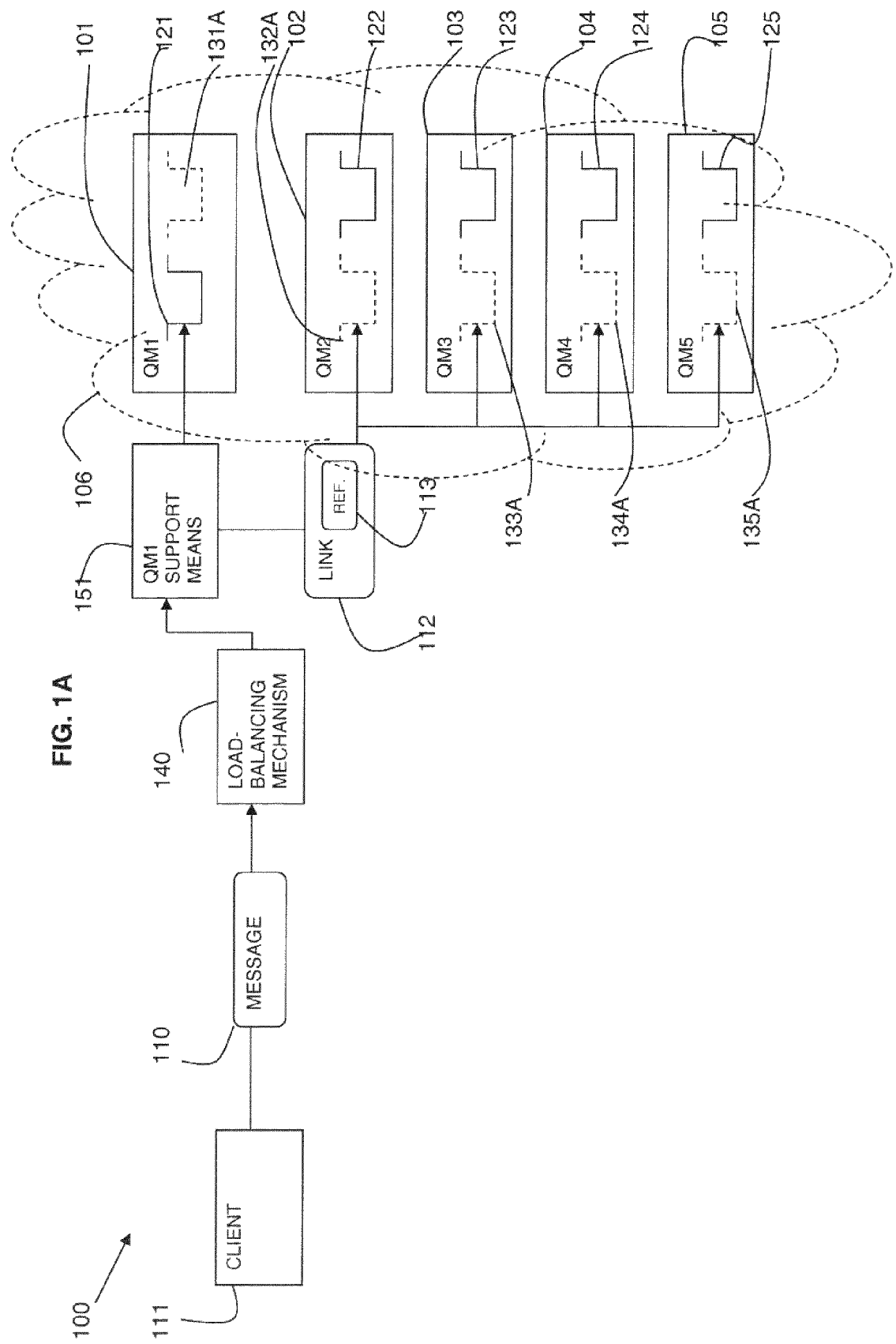
FIG. 1A a schematic diagram of an embodiment of a system in accordance with the present invention.
Figure 1B:
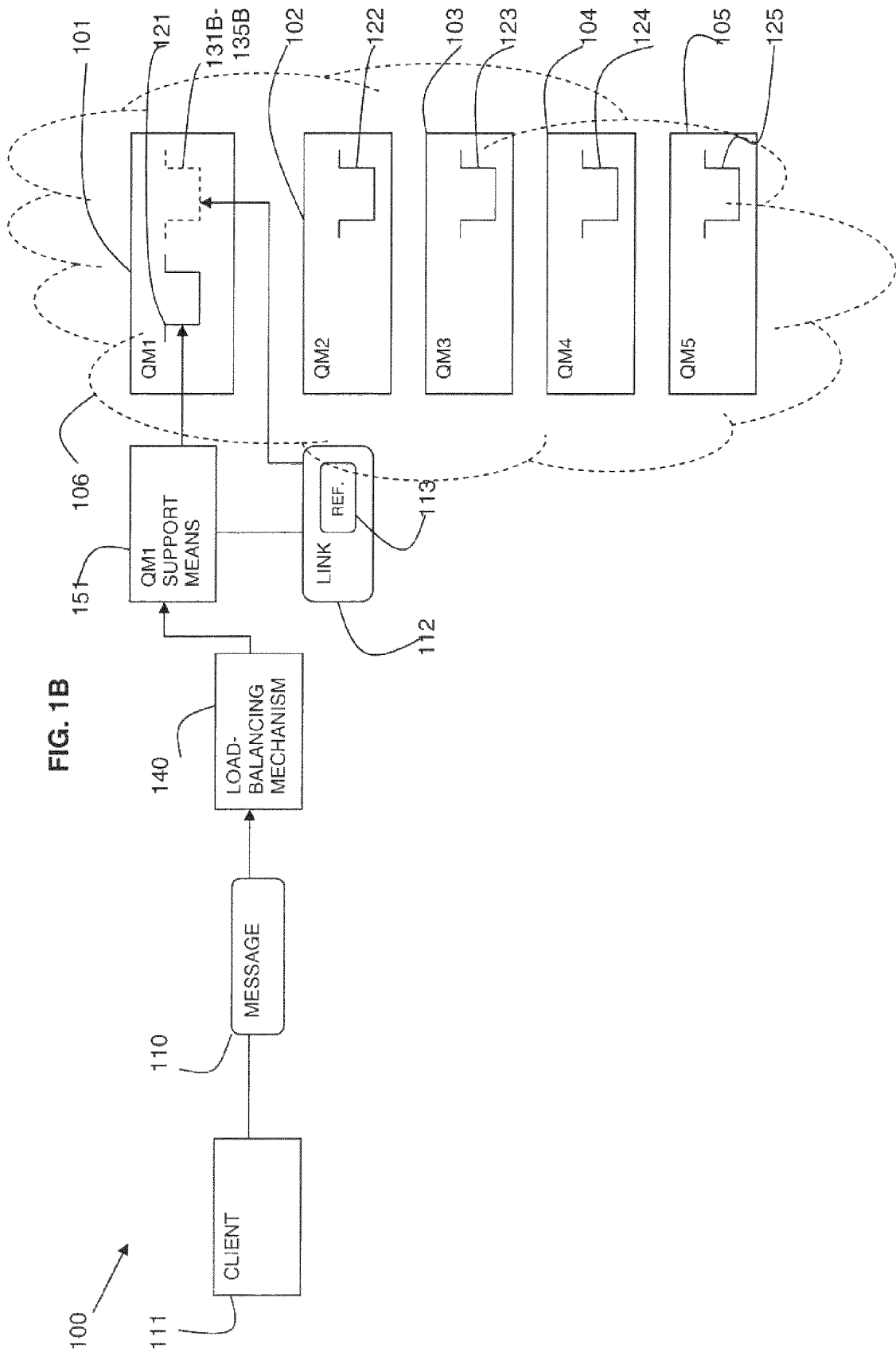
FIG. 1B a schematic diagram of another embodiment of a system in accordance with the present invention.

Referring to FIGS. 1A and 1B, a system 100 is provided in a messaging network having multiple horizontal messaging or queue managers 101-105, for example in a cluster 106. Queue managers 101-105 provide a logical container for the message queues and are responsible for transferring data to other queue managers 101-105 via message channels. However, other forms of message managers may be used.

A message 110 put by a messaging client 111 is put to a queue 121 on one of the queue managers 101. This queue 121 may be selected by a load-balancing mechanism 140.

A message support means 151 is provided coupled to or integral to the queue manager 101. The support means 151 may take various forms as described further below and may be a one to one relationship between the support means 151 and a queue manager 101, or there may be one support means 151 for multiple queue managers 101-105, or there may be multiple support means 151 for a single queue manager 101. The support means 151 generates a link message 112 to the message 110 and sends the link message 112 to a special type of queue 132-135 for the other horizontal queue managers 102-105. The special type of queue may be referred to a cluster queue.

The described system can apply to horizontally scaled messaging networks. Horizontal scaling is provided with one queue manager 101-105 per machine and IP spraying or name aliasing is carried out at the load-balancing mechanism 140. The described system can also apply to vertically scaled messaging networks in which there is more than one queue manager 101-105 per vertically scaled machine.

In one embodiment shown in FIG. 1A, the cluster queues 132A-135A for the other queue managers 102-105 to which the link message 112 is sent are provided on each of the cluster's queue managers 102-105. The cluster queue managers 102-105 also have their own local queues 122-125. Similarly, the first queue manager 101 may also have a cluster queue 131A for use if a message is received to one of the other queue managers 102-105. A reference 113 is made in the link message 112 as to the queue manager 101 where the message 110 actually resides.

The link message 112 may be sent by the support means 151 to the cluster queues 132A-135A by a put request. Alternatively, the link message 112 may be sent by the support means 151 to the cluster queues 132A-135A by publishing the linked message on a (well-known) topic in a publish/subscribe manner. Each queue manager 102-105 subscribes on the topic and puts the message to its local cluster queue 132A-135A.

In another embodiment shown in FIG. 1B, the cluster queues 131B-135B for the queue managers 101-105 may be provided as a single queue or multiple queues 131B-135B on the first queue manager 101. The support means 151 of the other queue managers 102-105 have access to the cluster queue or queues 131B-135B.

The link message 112 contains only a subset of the original message 110. It is preferable to reduce the size of the link message 112 in order to reduce network flow. The reference 113 in the link message 112 residing on the cluster queues 132-135 provides a more optimistic get scenario.

When a client wishes to retrieve a message 110 by a get request, the get request is sent to any one of the queue managers 101-105 in the cluster 106. The support means 151 for the queue manager 101-105 to which the get request has been sent, checks its local queue 121-125 for the message 110. This check may be based on message header properties, or on a CorrelationID of the message 110.

If the local queue 121-125 on the queue manager 101-105 does not contain the message 110, the support means 151 then checks the cluster queue 131-135 of the queue manager 101-105 to which the get request has been sent. Again this check may be based on message header properties, or on a CorrelationID of the message 110. If a link message 112 to the message 110 is found on a cluster queue 131-135, the reference 113 in the link message 112 can be followed to retrieve the message 112 from the queue 121-125 where it is on another queue manager 101-105.

The link message 112 may contain sufficient information for queue managers to have message selectors. Message selectors, for example in JMS (Java Message Service, Java is a trade mark of Sun Microsystems, Inc.), work on certain key attributes of a message, and therefore it may be preferable to place at least enough information in the link message 112 on the cluster queues 132-135 such that queue managers can make selections. This enables a specific message to be retrieved.

The described system can also be extended to non-specific gets (without a selector) where the remote cluster queue(s) will always be checked for messages if none exist on the local queue. If the link message contains basic information, for example, that there is a message on a particular queue, this would enable the client to simply request any message rather than a specific message indicated by an identifier.

In order to maintain performance, it is desirable to reduce the number and size of messages flowing around the messaging system. To reduce the number of messages flowing around the messaging system, the function of providing a link message 112 to the cluster queues 131-135 may be enabled for only particular queues and topics. An administrator may be provided to selectively enable the function of providing a link message 112 after checking the queues and topics.

Figure 2A:
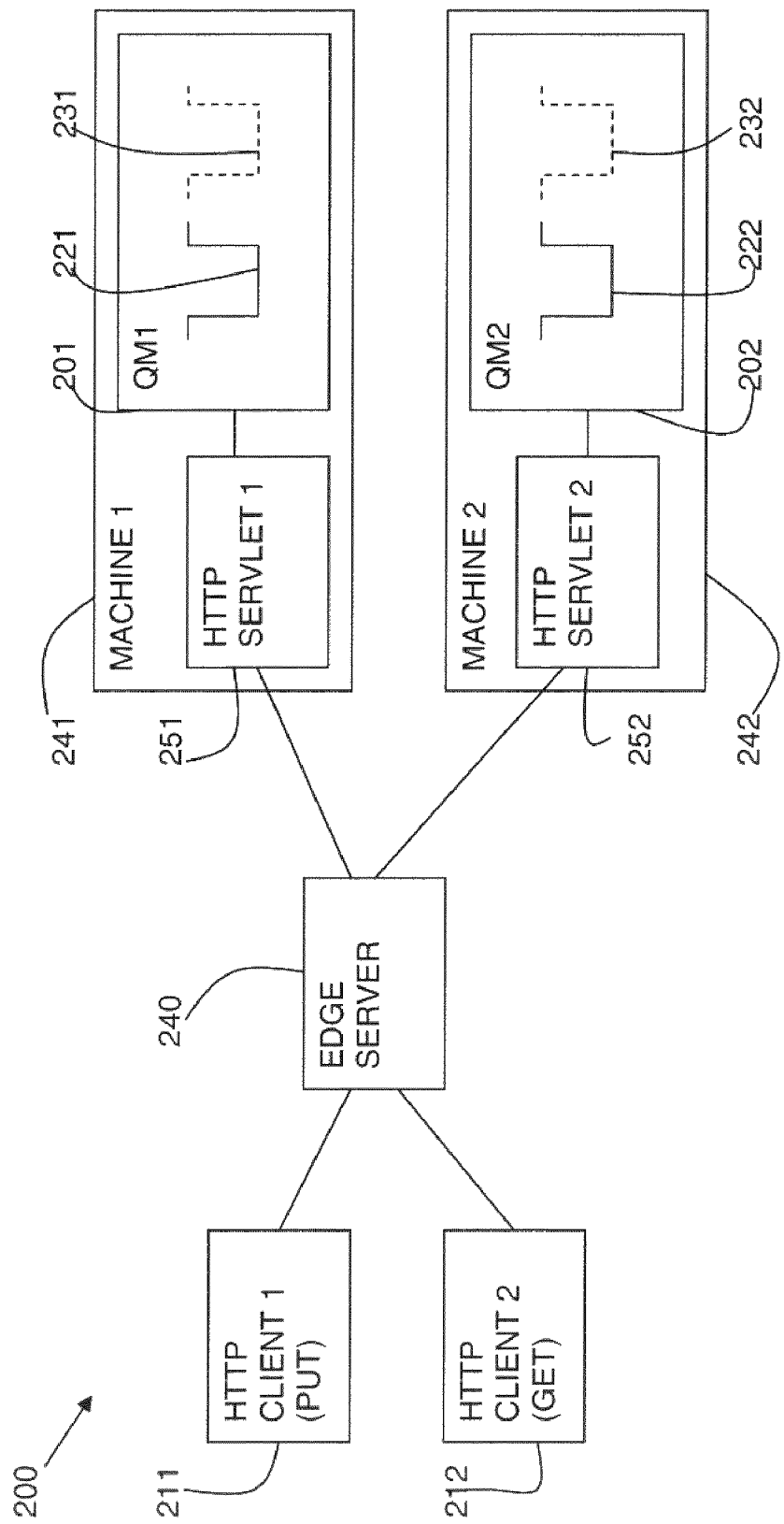
FIG. 2A is block diagram of a further embodiment of a system in accordance with the present invention.
Figure 2B:
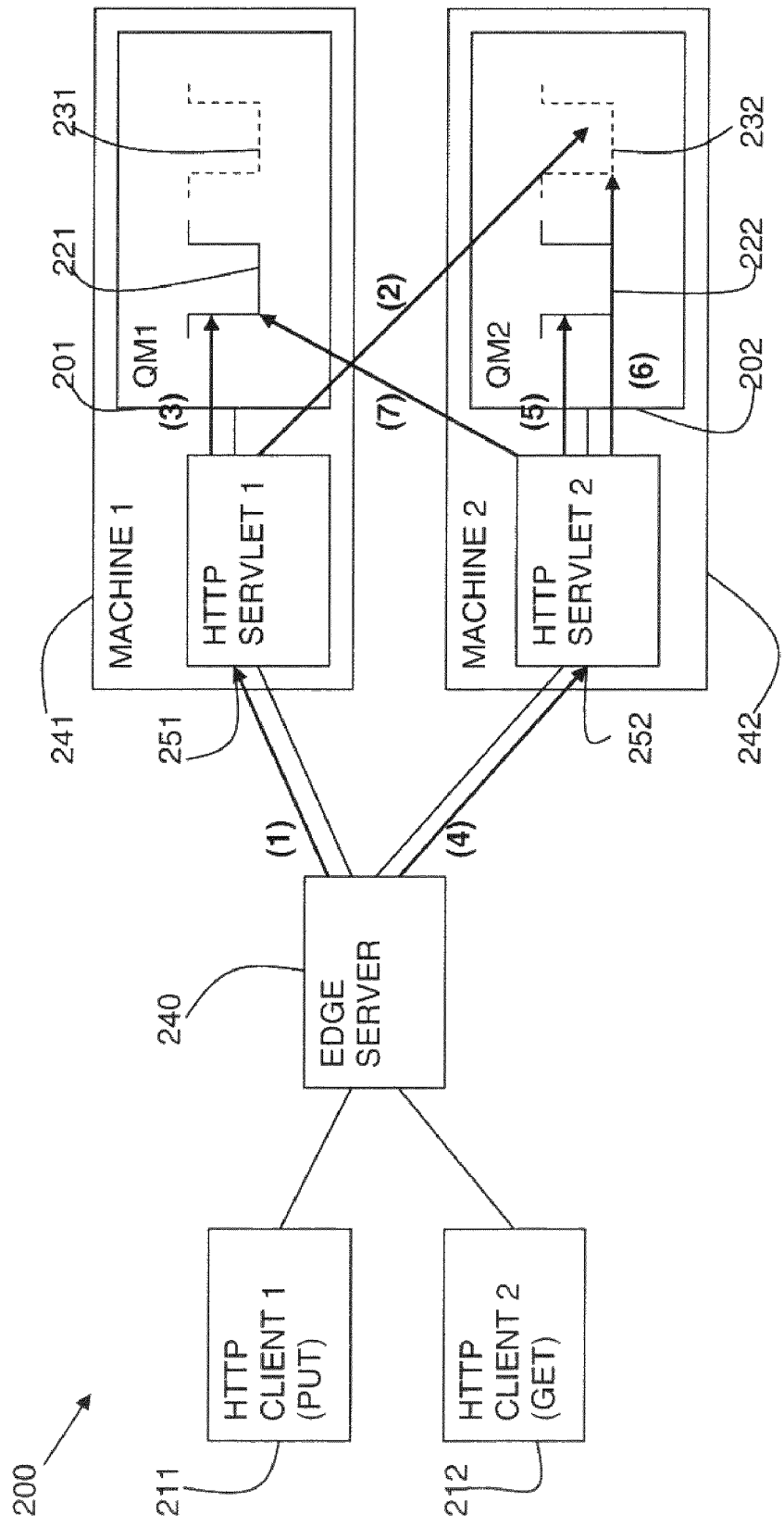
FIG. 2B is the block diagram of FIG. 2A showing a message flow in accordance with the present invention.

An embodiment of the system is described in the environment of HTTP messaging networks. Referring to FIGS. 2A and 2B, FIG. 2A shows a block diagram of an HTTP messaging network 200 and FIG. 2B shows the same diagram with a message flow illustrated.

The HTTP messaging network 200 is shown with a first HTTP client 211 which puts a message to the messaging network and a second HTTP client 212 which wishes to get the message put by HTTP client 211. HTTP servlets 251, 252 act as a communications bridge between the HTTP environment and the messaging environment. If a message has been put to a queue within a cluster of messaging managers by an HTTP client, any messaging or queue manager within that cluster should be able to see the message for easy message retrieval by HTTP clients.

An edge or proxy server 240 load-balances the HTTP requests made by clients 211, 212 to the HTTP servlets 251, 252 which are connected to the queue managers 201, 202 to distribute requests across multiple machines 241, 242. A client 211, 212 has no option as to which machine 241, 242 the put request goes to.

Each machine 241, 242 in the HTTP messaging network 200 hosts a queue manager 201, 202 which provide a logical container for the message queues 221, 222 and are responsible for transferring data to other queue managers via message channels.

The described system can apply to horizontally scaled HTTP messaging networks. In an HTTP messaging network 200, horizontal scaling is provided with one HTTP server per machine and IP spraying or name aliasing is carried out at the edge server. The described system can also apply to vertically scaled HTTP messaging networks in which there is more than one server per machine. For example, two HTTP servers may be provided on a machine with, for example, two processors and name aliasing is done by the edge server.

The HTTP messaging network function relies on all HTTP client requests passing through an instance of a HTTP servlet 251, 252 where the support is implemented sitting on an HTTP server in-front of a queue manager 201, 202. A link message is generated to a message put onto its local queue 221. The link message contains a subset of the information contained in the message including a reference to the location of the message. The link message may be generated by the HTTP servlet 251, 252 or the queue manager 201, 202.

The queue managers 201, 202 in addition to their regular queues 221, 222 have special queues 231, 232 for holding the link messages to messages on other queue manager's 201, 202 queues 221, 222. As described in relation to FIGS. 1A and 1B, the special queues 231-232 for holding the link messages may be provided on the queue manager 201 in which the message is put with access from the other queue manager 202, or on the other queue manager 202 itself.

When a message is put to a queue 221 of a queue manager 201, a corresponding link message is placed on all other queue managers 202 that are taking part in the horizontal cluster. The link message is put or published to a special queue 232, for example, named HTTP.CLUSTER.QUEUE.

When a message is requested using HTTP, the HTTP request goes to any HTTP servlet and thus through to a queue manager connected to the HTTP servlet. Thus the request is received at any queue manager within the cluster according to whatever selection method is being used (workload balancing, round robin, etc). The HTTP servlet 252 that has the request firstly looks on its local queue 222 for the message. If it is not there, then it attempts to find the message on the special queue 232 (HTTP.CLUSTER.QUEUE).

If the link message is found on the special queue 232, the reference in the link message is followed to retrieve the full message from its queue 221 on a different queue manager 201.

Using this system means that no changes need be made to the queue managers, as the logic is all held within the HTTP servlets. It is a non-invasive way of addressing a potentially very invasive problem. It does not rely on any kind of client to queue manager affinity.

Referring to FIG. 2B, an example of this process is illustrated by numbered arrows in the figure. A message arrives (1) on a first queue manager (QM1) 201 (destined for a queue 221 on QM1 201) via HTTP server 1 251. QM1 201 is part of a two queue manager cluster with a second queue manager (QM2) 202.

Upon receiving the message, HTTP support residing on HTTP server 1 251 strips out the original data and replaces it with a reference to its local queue manager (QM1) 201. For example, an XML message that reads <ORIGINALQ="QM1">. This shortened link message is put (2) on to all the HTTP.CLUSTER.QUEUES in the cluster. In this case it is put to the HTTP.CLUSTER.QUEUE 232 on QM2 202. The original message is then placed (3) onto the queue 221 on QM1 201.

A request comes (4) into QM2 202 for a message, for example, with message header properties or with a specified CorrelationID from a different client. The local queue 222 on QM2 202 is checked (5) by HTTP support on HTTP server 2 252. The message is not found. The HTTP server support then checks (6) its local or remote HTTP.CLUSTER.QUEUE 232 for the message link which it finds. The message link is read and HTTP server 2 252 makes a remote request (7) to QM1 201 for the message.

If another client request has come into QM1 and picked the message from the queue before the message get request (4) to QM2 happens then the message will not be available on QM1 for the request (4) to pick-up. The request (4) will simply fail as normal.

In another embodiment, the system is described in a non-HTTP messaging network. In a non-HTTP messaging network, a support means such as the HTTP servlet is not provided for each messaging or queue manager. Instead API crossing exits are used to intercept messages and replicate the message key information.

Messaging networks, for example WebSphere MQ (WebSphere MQ is a trade mark of International Business Machines Corporation) provide a means for transforming data between different architectures and protocols, such as Big Endian to Little Endian (Endian is a trade mark of Endian S.R.L), or EBCDIC (Extended Binary Coded Decimal Interchange Code) to ASCII (American Standard Code for Information Interchange). This is accomplished through the use of message data exits. Exits are compiled applications which run on the queue manager host, and are executed by the WebSphere MQ software at the time data transformation is needed.

Figure 3:
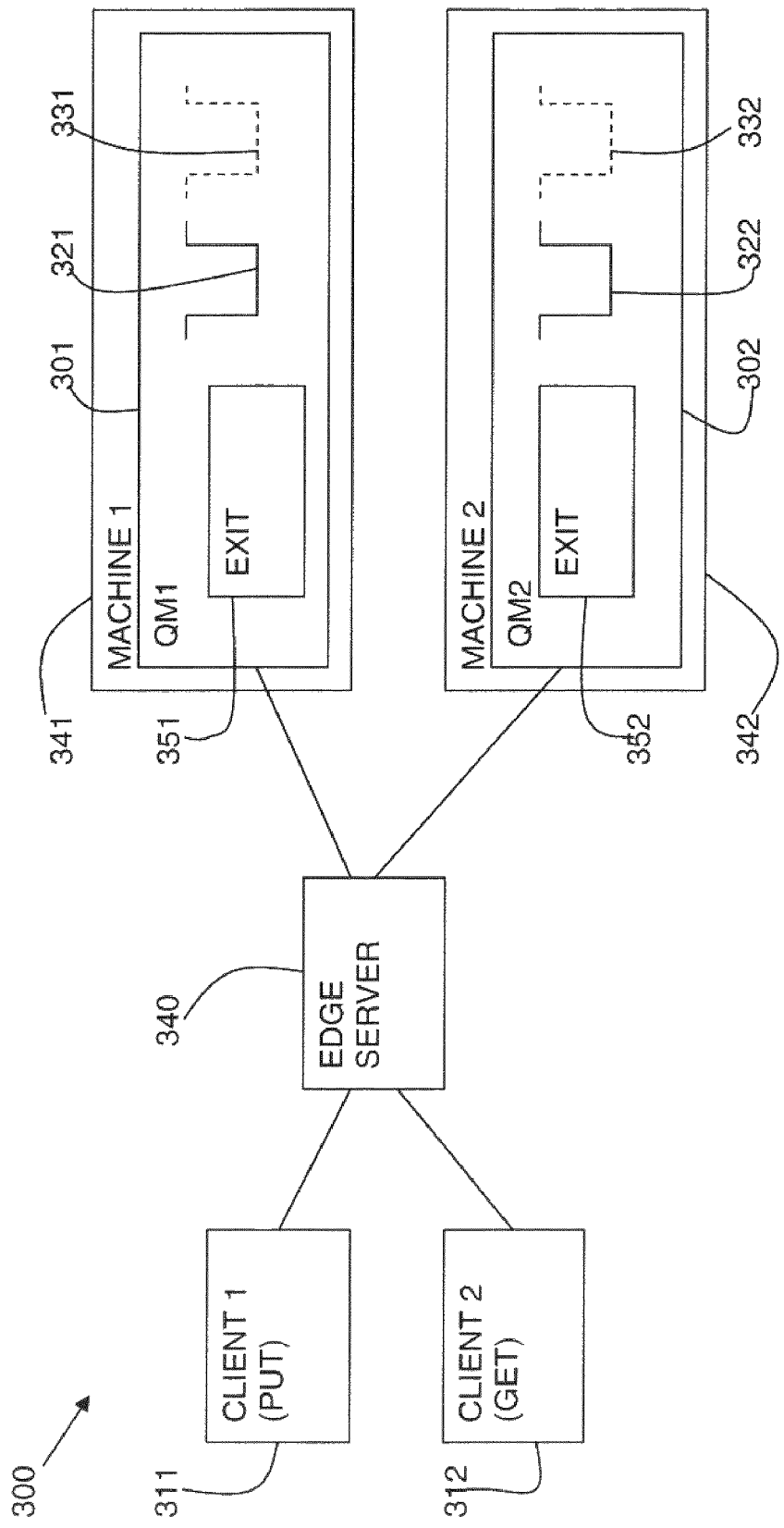
FIG. 3 is block diagram of a yet further embodiment of a system in accordance with the present invention.

Referring to FIG. 3, a messaging network 300 is shown in a non-HTTP environment. A first client 311 puts a message to the messaging network 300 and a second client 312 which wishes to get the message put by the first client 311.

An edge or proxy server 240 load-balances the message requests made by clients 311, 312 to the queues 321, 322 distributed across multiple machines 341, 342. A client 311, 312 does not specify to which machine 341, 342 the put request goes to.

Conventionally, a client can specify the particular queue manager, even in a scaled environment (HTTP and non HTTP). The described system works on the basis that the client does not specify the queue manager (but just the queue name) in order to allow scaling to be effective. The scaling may be horizontal or vertical.

Each machine 341, 342 in the messaging network 300 hosts a queue manager 301, 302 which provide a logical container for the message queues 321, 322.

The messaging network function uses exits 351, 352 which are logic implemented in a queue manager 301, 302 where the support is implemented. The exits 351, 352 provide support to generate a link message to a message put onto its local queue 321. The exits 351, 352 intercept messages and replicate the message key information in a link message. The link message contains a subset of the information contained in the message including a reference to the location of the message.

The queue managers 301, 302 in addition to their regular queues 321, 322 have special queues 331, 332 for holding the link messages to messages on other queue manager's 301, 302 queues 321, 322. As described in relation to FIGS. 1A and 1B, the special queues 331-332 for holding the link messages may be provided on the queue manager 301 in which the message is put with access from the other queue manager 302, or on the other queue manager 302 itself.

When a message is put to a queue 321 of a queue manager 301, a corresponding link message is generated by an exit 351, 352 and placed on all other queue managers 302 that are taking part in the horizontal cluster. The link message is put to a special queue 332 or published by the first queue manger 301 with a topic and received at the second queue manager 302 by that queue manager 302 subscribing to the topic using an exit or built-in to the queue manager 302 mechanism.

When a message is requested, the request can be sent to any queue manager within the cluster according to whatever selection method is being used (workload balancing, round robin, etc). The exit 352 of the queue manager 302 that has the request firstly looks on its local queue 322 for the message. If it is not there, then it attempts to find the message on the special queue 332.

If the link message is found on the special queue 332, the reference in the link message is followed to retrieve the full message from its queue 321 on a different queue manager 301.

The HTTP servlets 251, 252 and the exits 351, 352 providing the link message support may be provided in the form of a support pack for existing messaging networks.

Messaging networks may be adapted for use with HTTP messages and a bridge may be provided including the described functions for message delivery and retrieval.

The non-HTTP embodiment of using exits may be provided as subsequently installable code or in the product itself.

There may be messaging networks including both HTTP clients and other non-HTTP clients. The first embodiment described in relation to FIGS. 2A and 2B solves the problem of affinity when both clients are HTTP clients. There may be a scenario in which a third party, for example, an external application, takes the original message from the queue, and places a reply onto another queue. The external application uses the same sort of logic encapsulated into an exit on each queue manager. Such that each put to a machine from the external application is registered with the entire cluster as before.

The servlet logic is contained within the client connection logic (the Java Enterprise Edition (JEE) connector architecture (JCA) in a JEE connection scenario or the client connection if just a standard connection), rather than the application that uses the client connection. This enables modification to be implemented in a non-invasive manner.

Management of the link messages on the special queues also has to be considered. This queue could very easily get filled up with link messages because it has a synopsis of every message delivery on every clustered queue in the HTTP cluster. Various standard timeout and clean-up policies can be employed to ensure that this is not a problem.

The clean up is standard practice for messaging network administrators. It could be left to administrators to ensure that the queues get cleaned up as and when they desired, for example, when a queue was too big.

The clean-up needs to take into account the fact that messages might not have actually expired yet. A solution to this problem is that the queue manager that holds the actual message publishes a "delete this message reference" to the messaging network and all the local queue managers act this out so that they clean out their copy of the reference message. This also means that each queue manager ensures that this clean up is done when each individual queue manager is not too busy.

There may also be occasions when the original message times out, in which case the queue manager needs to understand that the message was a "clustered" message and then publish the "delete this message reference" to all the other queue managers. The cluster message may alternatively have the same timeout as the original message.

Scalability of this special queue can also be considered such that a shadow queue mechanism is provided, for example, for every local Q1 there is a Q1.CLUSTER.QUEUE. A single cluster queue may alternatively be used for multiple local or remote queues.

Figure 4:
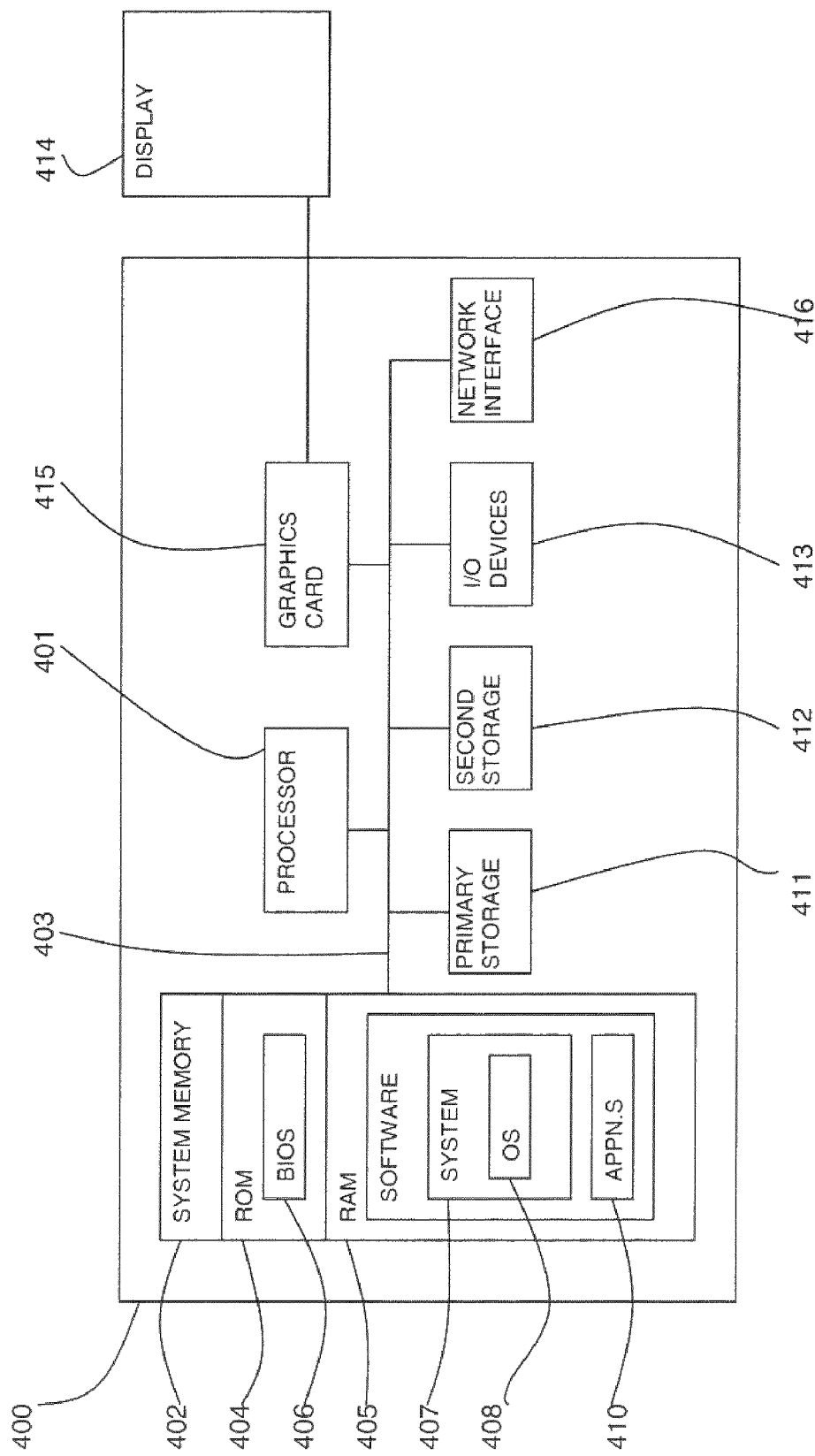
FIG. 4 is a block diagram of a computer system in which the present invention may be implemented.

Referring to FIG. 4, an exemplary system for implementing the invention includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Figure 5:
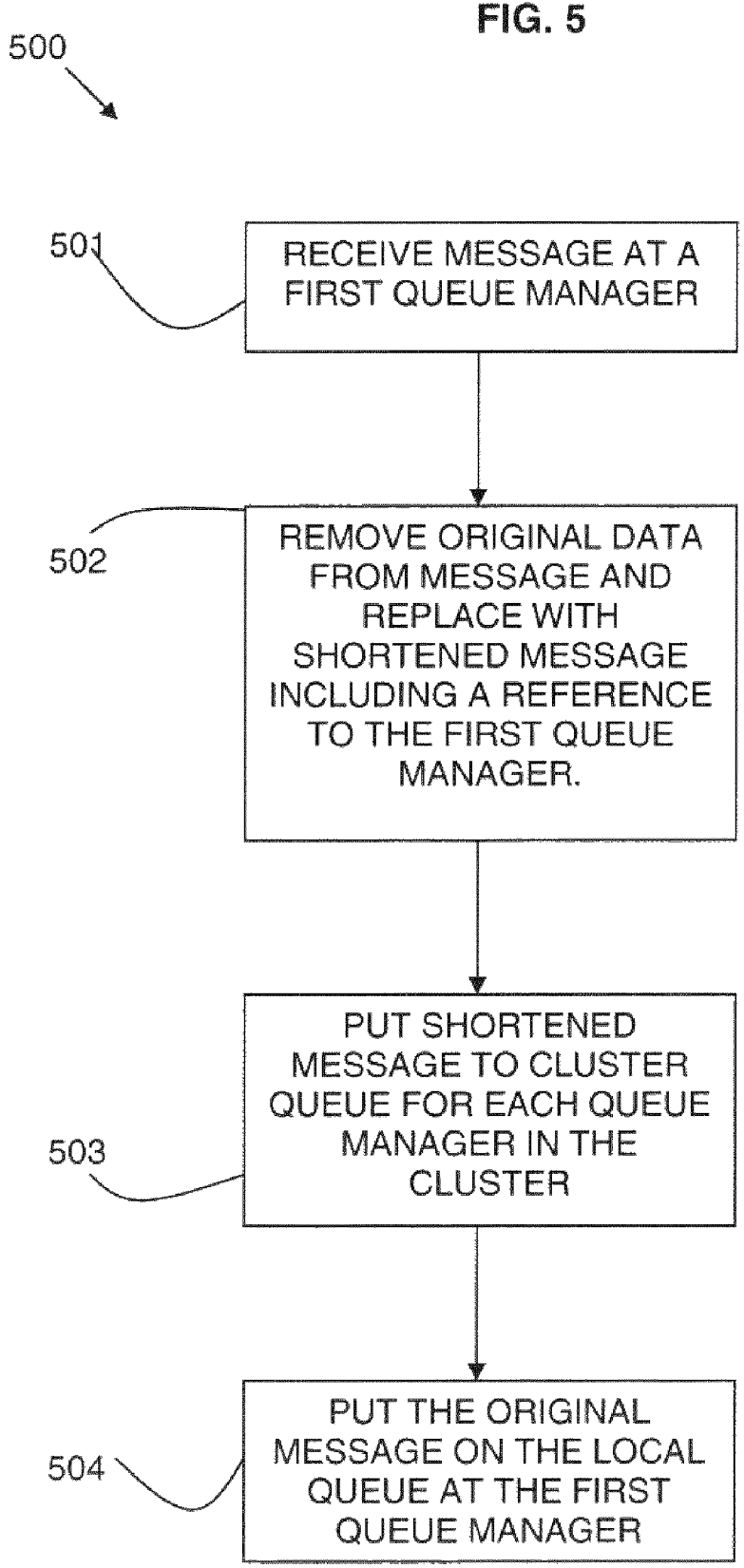
FIG. 5 is a flow diagram of a message put process in accordance with an aspect of the present invention.

Referring to FIG. 5, a flow diagram 500 is shown illustrating a message put process of the described system. A put message is received 501 at a first queue manager. The original data is striped out 502 of the message and replaced with a shortened message including a reference to the first queue manager. The shortened message may optionally include sufficient information for message selections to be made. The shortened message is put 503 to a cluster queue either on each queue manager in a cluster or on a joint cluster queue at one of the queue managers. The original message is put 504 onto the local queue of the queue manager.

Referring to FIG. 6A, a flow diagram 600 is shown illustrating a message get process of the described system. A get request for a message is received 601 at a second queue manager. The local queue at the second queue manager is checked 602. It is determined if the message is found 603. If the message is found, the message is returned 604.

If the message is not found, the process proceeds to check 605 in the cluster queue for a shortened message. The cluster queue may be local at the second queue manager or may be remote on another queue manager. This check may include using message selectors to look for a specific message using information in the shortened message. It is determined if the shortened message is found 606. If a shortened message relating to the requested message is not found on the cluster queue, the request fails 607. If it is found on the cluster queue, the reference in the shortened message is followed 608 to the queue manager on which the full message is held. A remote request is made 609 to the queue manager where the full message is held. The full message is returned 610 from the local queue of the queue manager where the message is held.

Figure 6B:
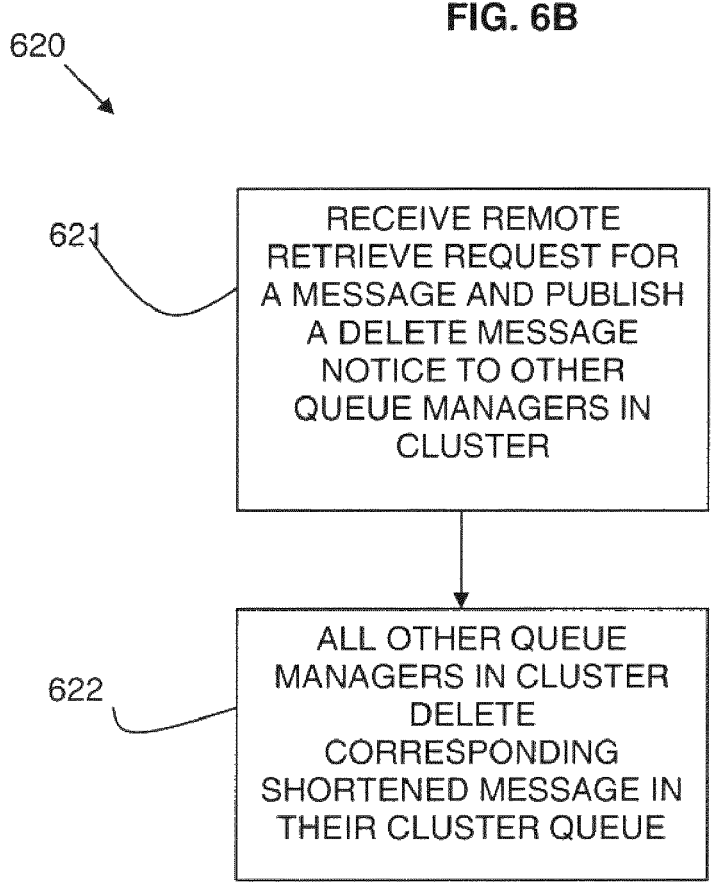

Referring to FIG. 6B, a flow diagram 620 is shown illustrating a clean up process of the described system. The queue manager, to which a remote request is made for a message on its local queue, publishes 621 a delete message for the retrieved message to all queue managers in the cluster. All the queue managers in the cluster delete 622 the shortened message relating to the retrieved message from their cluster queue.

Figure 6C:
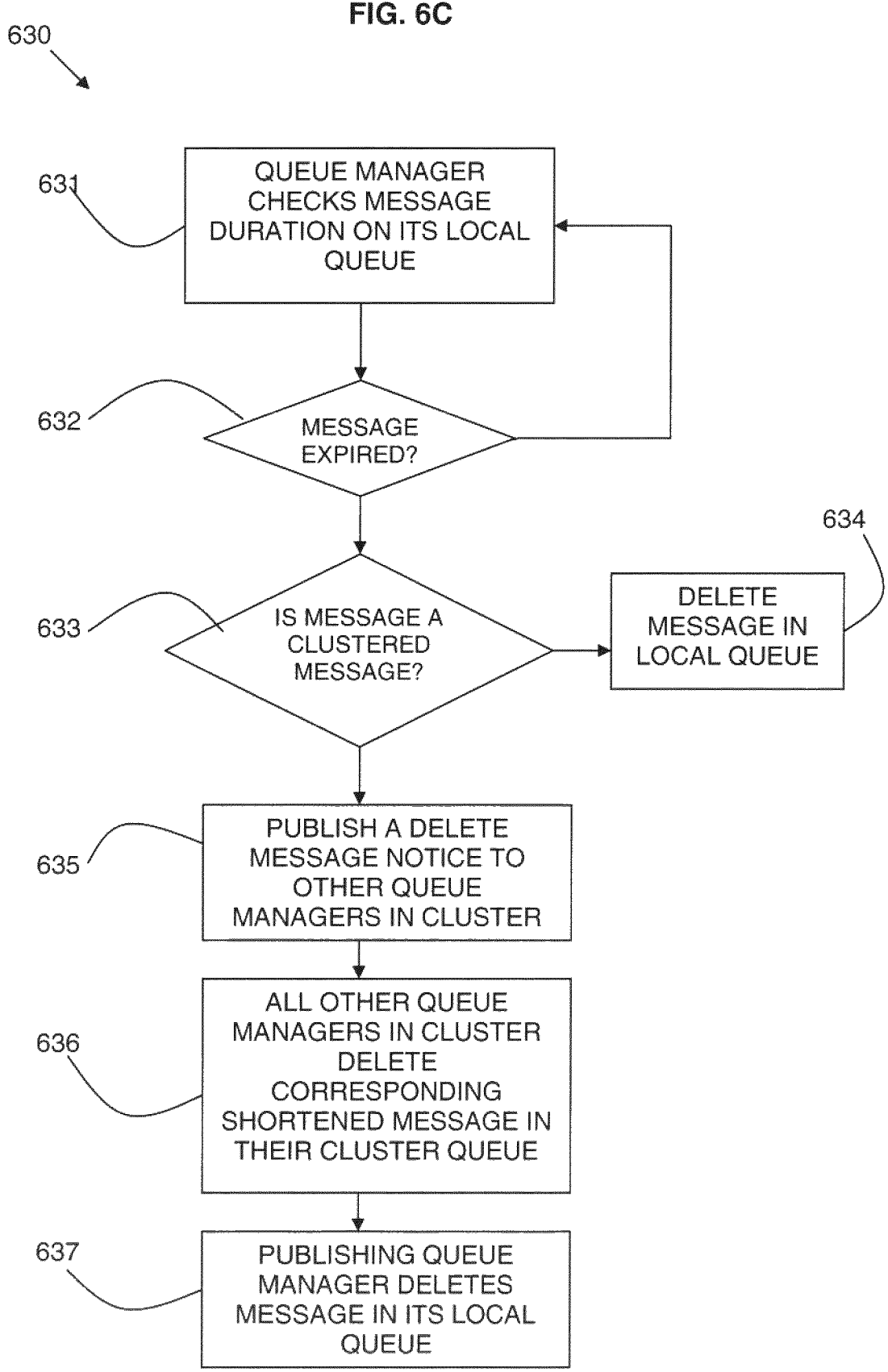

Referring to FIG. 6C, a flow diagram 630 is shown illustrating a further clean up process of the described system. The queue manager holding a message in its local queue checks 631 a message duration on the queue. It is determined 632 if the message has timed-out. If a message has not timed-out, the process loops to continue checking 631 the message. If a message has timed-out, it is determined 633 if the message was a clustered message. If not, the message is just deleted 634. If the message was a clustered message, the queue manager publishes 635 a delete message to all queue managers in the cluster. All the queue managers in the cluster delete 636 the shortened message relating to the message from their cluster queue. The queue manager also deletes 637 the full message from its local queue.

A support server alone, or as part of a messaging system, providing the link message functionality may be provided as a service to a customer over a network.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD. Improvements and modifications can be made to the foregoing without departing from the scope of the present invention.

The invention claimed is:

1. A method of message delivery in a messaging network having a group of a plurality of queue managers, the method comprising:
    receiving a message at a first queue manager of the plurality of queue managers, wherein each queue manager of the group of the plurality of queue managers includes a local message queue for storing received messages and has access to a link message queue, in which link messages are stored;
    creating a link message using at least a subset of original message data from the received message;
    adding a reference to the link message associated with the first queue manager;
    sending the link message to a link message queue; and
    putting the original message to a local message queue on the first queue manager.

2. A method as claimed in claim 1, wherein a link message queue is provided on each of the queue managers in the group.

3. A method as claimed in claim 1, wherein a link message queue is provided on a queue manager and is accessible by the other queue managers in the group.

4. A method as claimed in claim 1, wherein sending the link message comprises: putting the link message to the link message queue.

5. A method as claimed in claim 1, wherein sending the link message comprises: publishing the link message on a topic and enabling the queue managers in the group to subscribe to the topic.

6. A method as claimed in claim 1, wherein the creating the link message further comprises:
    removing the at least subset of the original message data; and
    maintaining sufficient data for message selections to be carried out on the link message.

7. A method as claimed in claim 1, wherein the group of a plurality of queue managers comprises a cluster of queue managers.

8. A method as claimed in claim 1, wherein message requests are sent to any one of the queue managers in a group.

9. A method as claimed in claim 8, wherein the message requests are load-balanced across the group of queue managers.

10. A method as claimed in claim 1, wherein the message can be retrieved using any one of the queue managers in the group.

11. A method as claimed in claim 1, wherein the link message is formed if a message is at least one of: destined for a predefined queue and related to a predefined topic.

12. A method as claimed in claim 1, further comprising:
    receiving a request to retrieve a message at a second queue manager in the group;
    checking the local queue of the second queue manager for the message;
    in response to the local queue of the second queue manager not containing the message, checking the link message queue of the second queue manager; and
    if a link message is found within the link message queue, retrieving the message from the queue manager referenced in the link message.

13. A method as claimed in claim 12, further comprising:
    receiving a request for a specific message; and
    using message selectors to check for the message in the local link message queue.

14. A method as claimed in claim 1, further comprising:
    determining whether a retrieved message has linked messages; and
    if it is determined that a retrieved message has linked messages, publishing a notice to delete the linked messages to the queue managers in the group.

15. A method as claimed in claim 1, further comprising:
    determining whether a message is older than a predefined limit; and
    if it is determined that a message is older than a predefined limit, publishing a notice to delete the linked messages associated with the message to the queue managers in the group.

16. A method as claimed in claim 1, wherein the method is carried out by a hypertext transfer protocol server coupled to a queue manager and a received message is a message from a hypertext transfer protocol client.

17. A method as claimed in claim 1, wherein the method is carried out by application programming interface that exits at the queue managers.

18. A computer program product comprising a storage type computer readable medium comprising computer usable program code adapted to perform a method of message delivery in a messaging network having a group of a plurality of queue managers, the method comprising:

receiving a message at a first queue manager of the plurality of queue managers, wherein each queue manager of the group of the plurality of queue managers includes a local message queue for storing received messages and has access to a link message queue, in which link messages are stored;

creating a link message using at least a subset of original message data from the received message;

adding a reference to the link message associated with the first queue manager; sending the link message to a link message queue; and putting the original message to a local message queue on the first queue manager.

19. A system for message delivery, comprising:

a messaging network comprising a group of a plurality of queue managers executed on a plurality of processors, each queue-manager comprising a local queue; and each of the queue managers comprising:

computer-executable instructions, that when executed by a processor among the plurality of processors, enables the queue manager to perform the functions of:

receiving a message at a first queue manager of the plurality of queue managers, wherein each queue manager of the group of the plurality of queue managers includes a local message queue for storing received messages and has access to a link message queue, in which link messages are stored;

creating a link message by removing at least some of original message data from a received message and adding a reference to the link message referring to the queue manager at which the message has been received; and sending the link message to a link message queue accessible by all the queue managers in the group.

20. A system as claimed in claim 19, wherein each queue manager has a link message queue.

21. An apparatus for message delivery in a messaging network having a group of a plurality of queue managers, the apparatus comprising:

one or more processors associated with a plurality of queue managers; and computer-executable instructions executed by a processor among the one or more processors that enables the apparatus to perform the functions of:

receiving a message at a first queue manager of the plurality of queue managers, wherein each queue manager of the group of the plurality of queue managers includes a local message queue for storing received messages and has access to a link message queue, in which link messages are stored;

creating a link message using at least a subset of original message data from the received message;

adding a reference to the link message associated with the first queue manager;

sending the link message to a link message queue; and putting the original message to a local message queue on the first queue manager.

* * * * *